United States Patent [19]
Howard

[11] Patent Number: 4,495,318
[45] Date of Patent: Jan. 22, 1985

[54] LOW TACK MICROSPHERE GLUE

[75] Inventor: Philip H. Howard, Jamesville, N.Y.

[73] Assignee: International Cube Corporation, Syracuse, N.Y.

[21] Appl. No.: 591,948

[22] Filed: Mar. 21, 1984

[51] Int. Cl.³ .............. C08F 2/30; C08F 265/02; C08L 51/00
[52] U.S. Cl. .................. 524/375; 524/376; 524/460
[58] Field of Search .......... 524/460, 375, 376; 523/223

[56] References Cited

U.S. PATENT DOCUMENTS

| | | | |
|---|---|---|---|
| 3,143,532 | 8/1964 | Kahrs | 523/223 |
| 4,166,152 | 8/1979 | Baker | 524/745 |
| 4,389,507 | 6/1983 | Podzun | 524/460 |

Primary Examiner—C. Warren Ivy
Attorney, Agent, or Firm—Bruns and Wall

[57] ABSTRACT

Inherently tacky, elastomeric, solvent-dispersible, solvent-insoluble, polymeric microspheres prepared using a non-ionic emulsifier. The tacky microspheres are particularly adapted for use as a low tack microsphere glue that can be applied to a sheet material substrate whereby the latter is provided with a reusable adhesive surface.

1 Claim, No Drawings

LOW TACK MICROSPHERE GLUE

BACKGROUND OF THE INVENTION

This invention relates generally to tacky polymeric microspheres, and has particular reference to inherently tacky, elastomeric, solvent-dispersible, solvent-insoluble, polymeric microspheres and a process for preparing same using a non-ionic emulsifier.

In U.S. Pat. No. 4,166,152, granted Aug. 28, 1979 to W. A. Baker et al, there is a disclosure of inherently tacky acrylate homopolymer microspheres prepared by aqueous suspension polymerization techniques utilizing a suspension stabilizer and an anionic emulsifier. The microspheres prepared by this method had an average particle size of 10–60 microns. While the inherently tacky microspheres disclosed by Baker have desirable properties for certain applications, it has been found that anionic emulsifiers retard particle coalescence by surrounding the particle with a charged double layer. This coulombic barrier of the anionic emulsifiers is sensitive to electrolytes and freezing, and sensitivity to freezing can be a disadvantage in cold weather shipments and during storage.

Other pertinent prior patents of which the applicant is aware are U.S. Pat. Nos. 3,513,120; 3,691,140; 3,857,731; 4,049,483 and 4,049,604.

SUMMARY OF THE INVENTION

The present invention is directed to inherently tacky microspheres having similar properties to those disclosed by the Baker patent but which are prepared using a non-ionic emulsifier. The tacky microspheres provided by the invention are particularly adapted for use as a low tack microsphere glue that can be applied to a sheet material substrate whereby the latter is provided with a reusable adhesive surface.

It has been found that the use of non-ionic emulsifiers imparts unique and desirable characteristics to microsphere adhesives. Thus, the utilization of a non-ionic emulsifier in the emulsion operates to surround the microspheres with a hydrated layer of surfactant that acts as a steric barrier to particle coalescence and this in turn results in an end product that is considerably more resistant to freezing than products prepared using an anionic emulsifier. Samples of the inherently tacky microspheres disclosed by the invention have been exposed to freeze/thaw cycles as have samples of the mircospheres taught by the Baker patent. In these tests, the Baker microspheres coagulated upon freezing and did not redisperse when thawing occurred whereas microspheres prepared according to the invention did not coagulate.

DESCRIPTION OF THE PREFERRED EMBODIMENT

In the present invention, the low tack microsphere glue is essentially comprised of inherently tacky, elastomeric, solvent-dispersible, solvent-insoluble, polymeric microspheres (having an average particle size of 20–60 microns) prepared using a non-ionic emulsifier. The microspheres are derived from non-ionic monomers and include a water emulsifiable methacrylate ester or alkyl acrylate. The microspheres are prepared by aqueous suspension polymerization techniques using a suspension stabilizer and, as noted, a non-ionic emulsifier.

In a preferred embodiment of the invention, the monomer is 2-ethylhexyl acrylate, the stabilizer is an aqueous solution of polyacrylic acid, and the non-ionic emulsifier is an oleyl alcohol ethoxylate. A catalyst is also employed in the polymerization of the monomer, the catalyst being a benzoyl peroxide in the preferred embodiment.

EXAMPLE 1

To a five liter, 3-necked flask equipped with thermometer, mechancial stirrer, reflux condenser, and vacuum and nitrogen inlet tube, were added 2820 grams of deionized or distilled water and 54 grams of Carbopol EX-17 (trademark for a 15% active aqueous solution of polyacrylic acid of 300,000–500,000 molecular weight range commercially available from the B. F. Goodrich Co.). The contents of the flask were then mixed to dissolve the EX-17. Concentrated ammonium hydroxide was then added to the mixture until a pH of 7.0 was achieved.

To this solution were added 3.7 grams of Lucidol-70 (trademark for a 70% active benzoyl peroxide in water; granular, bulk density—55 lbs/ft.$^3$, freezing point less than 32° F.; commercially available from Lucidol Division, Penwalt Corp.) and 1000 grams of 2-ethylhexyl acrylate. Vacuum was then placed on the contents of the flask, the pressure therein being drawn to approximately 25 inches of mercury, and held for five minutes (while the mixture is stirred via vacuum tight stir assembly) to assure removal of dissolved air and oxygen. The vacuum was then broken with nitrogen. A nitrogen purge was maintained throughout the emulsion and polymerization steps. Added to the mixture was 21.5 grams of "Trycol OAL-23" (trademark for an oleyl alcohol ethoxylate (23 average moles of ethylene oxide), non-ionic surfactant; solid, m.p.—47° C., color gardner—2, cloud point 5% saline—89° C., flash point—440° C.; commercially available from Emery Industries, Inc.). Agitation for the mixture was set at 300 ppm.

The batch was then heated to 60° C. and maintained for 16 hours. As the temperature initially approached 60° C., a mild exotherm was noted which raised the temperature to approximately 70° C. After the 16 hour period, the suspension was passed through a 250 micron screen. The resultant homopolymer contained approximately 26.9% solids. Upon standing, the polymer spheres creamed to the surface, but were readily dispersed by agitating the mixture. Particle size ranged from 15–60 microns, with the average size approximately 35 microns.

EXAMPLES 2–6

These examples were prepared using the same equipment, monomer, stabilizer and procedures as outlined in Example 1. Each example illustrates the successful use of a non-ionic emulsifier in preparation of the microspheres.

| Example | Non-ionic Emulsifier | Particle Size[1] Range | Avg. | Tack[2] |
|---|---|---|---|---|
| 2 | 30 g Siponic F-300 (Alcolac, Inc.) | 20–80 | 60 | 85 |
| 3 | 120 g Siponic F-300 | 10–70 | 40 | 95 |
| 4 | 30 g Brij 98 (ICI, Americas, Inc.) | 15–40 | 30 | 72 |
| 5 | 15 g L-12 (Alcolac, Inc.) | 10–50 | 35 | 83 |

-continued

| Example | Non-ionic Emulsifier | Particle Size[1] Range | Avg. | Tack[2] |
|---|---|---|---|---|
| 6 | 21 g L-12 | 5-35 | 20 | 82 |

[1] Particle sizes were determined by microscopic examination.
[2] Tack levels were determined by testing samples of coated microspheres on paper backing with a Polyken, Jr. Probe Tack tester (manufactured by Testing Machines, Inc. under license from the Kendall, Corp.). Coating was accomplished by drawdowns using a No. 20 wirewound rod. Values represented herein are averages obtained from several testings of the coated paper. The conditions of the tack testing are as follows:

| | |
|---|---|
| Contact time: | 1 second |
| Separation time: | 1 cm/sec |
| Contact pressure: | 100 gm/cm$^2$ |
| Probe type: | ½ cm diameter 304 stainless steel tip-28 0 grit abrasive finish |
| Temperature: | approx. 22.5° C. |

Further information on the Polyken probe tack tester may be found in ASTM D29 79 Section 15.06, 1983.

In examples 2-6 above, the SIPONIC F-300 is polyethylene octylphenol ether—30 moles of ethylene oxide, 70% active ingredient, 1.095 spec. gravity at 25° C., cloud point—1% solution—greater than 100° C., 7-9 pH—5% solution, +2° C. pour point, 17.3 HLB value, greater than 150° C. flash point; available from Alcolac, Inc. The BRIJ 98 is polyethylene oleyl ether—20 moles of ethylene oxide, cream solid, 23° C. pour point, 15.3 HLB value; available from ICI Americas Inc. The "L 12" is polyethylene lauryl alcohol ether—12 moles of ethylene oxide, 100% active ingredient, 90° C. cloud point in 1% NaCl, 6.5 pH in 1% solution, 14.5 HLB value; available from Alcolac, Inc.

From the foregoing description it will be apparent that the invention provides an improved low tack microsphere glue having advantages over the prior art. As will be understood by those familiar with the art, the invention may be embodied in other specific forms without departing from the spirit or essential characteristics thereof.

I claim:

1. A low tack microsphere glue for application to a substrate to provide a reusable adhesive surface having microspheres surrounded by hydrated layers of surfactant which act as a steric barrier to particle coalescence prepared according to the process comprising the steps of:

admixing, in approximate parts by weight, 2820 parts water; 54 parts of a 15% aqueous solution of polyacrylic acid having a molecular weight of 300,000 to 500,000 until said acid is dissolved;

raising the pH of the solution to 7.0 by adding concentrated ammonium hydroxide thereto;

adding 3.7 parts of a 70% active benzoyl peroxide catalyst and 1000 parts 2-ethylhexyl acrylate to the solution;

holding said mixture under a vacuum of about 25 inches of mercury with stirring for about 5 minutes;

adding, under a nitrogen purge, about 21.5 parts of a non-ionic surfactant selected from the group consisting of octylphenol ethoxylate or polyoxyethylene oleyl ether with agitation;

heating the mixture to about 60° C. for about 16 hours to form an aqueous compression; and passing the suspension through a 250 micron screen to remove the small amount of unsuitable larger particle agglomerates.

* * * * *